US012607307B2

(12) United States Patent
Zeng

(10) Patent No.: US 12,607,307 B2
(45) Date of Patent: Apr. 21, 2026

(54) MULTIFUNCTIONAL LIGHT BULB, AND A DEVICE AND METHOD FOR CONTROLLING THE MULTIFUNCTIONAL LIGHT BULB

(71) Applicant: HueRich Photo-electronic Technology Co., Ltd., Dongguan (CN)

(72) Inventor: Haoping Zeng, Dongguan (CN)

(73) Assignee: HueRich Photo-electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 18/947,893

(22) Filed: Nov. 14, 2024

(65) Prior Publication Data

US 2025/0237362 A1 Jul. 24, 2025

(30) Foreign Application Priority Data

Jan. 24, 2024 (CN) ......................... 202410097782.9
Apr. 22, 2024 (CN) ......................... 202410483909.0

(51) Int. Cl.
*F21K 9/238* (2016.01)
*F21V 23/04* (2006.01)
*F21V 29/90* (2015.01)
*F21Y 115/10* (2016.01)

(52) U.S. Cl.
CPC .......... *F21K 9/238* (2016.08); *F21V 23/0435* (2013.01); *F21V 29/90* (2015.01); *F21Y 2115/10* (2016.08)

(58) Field of Classification Search
CPC .......... F21K 9/238; F21K 9/232; F21K 9/235; F21K 9/237; F21V 23/0435; F21V 29/90; F21V 23/045; F21V 33/00; F21V 23/003; F21Y 2115/10
See application file for complete search history.

(56) References Cited

U.S. PATENT DOCUMENTS

2012/0145699 A1* 6/2012 McMahan ............ H05B 3/0076 219/533
2012/0279950 A1* 11/2012 Chan ....................... F24C 7/065 219/201
2013/0114279 A1* 5/2013 Marley ................. F21S 41/153 362/516
2013/0249375 A1* 9/2013 Panagotacos ........... F21V 5/007 313/15

(Continued)

FOREIGN PATENT DOCUMENTS

CN 2890608 Y 4/2007
CN 212584918 U 2/2021

*Primary Examiner* — Evan P Dzierzynski
(74) *Attorney, Agent, or Firm* — JEEN IP LAW, LLC

(57) ABSTRACT

The present invention discloses a multifunctional light bulb, and a device and method for controlling the multifunctional light bulb, the multifunctional light bulb includes a light head, a light housing, a heating component, and a light-emitting module, the light-emitting module is provided with an LED light, and the heating component includes a heating wire and a control device, the main control module of the control device receives remote control signals from external smart household devices or receives wired control signals, can turn on and off the LED light and the heating wire through wired control or remote wireless control, or adjust the brightness of LED light and control the on/off of heating wire, or adjust the heating value of heating wire.

3 Claims, 6 Drawing Sheets

(56) References Cited

U.S. PATENT DOCUMENTS

| | | | | |
|---|---|---|---|---|
| 2014/0070703 | A1* | 3/2014 | Chen | H05B 45/10<br>315/294 |
| 2015/0055363 | A1* | 2/2015 | Van Straten | B60Q 1/0017<br>362/520 |
| 2020/0290502 | A1* | 9/2020 | Cubon | F21S 45/60 |

* cited by examiner

MULTIFUNCTIONAL LIGHT BULB, AND A DEVICE AND METHOD FOR CONTROLLING THE MULTIFUNCTIONAL LIGHT BULB

CROSS-REFERENCE TO RELATED APPLICATIONS

This application claims priority to Chinese Patent Application No. 202410097782.9, filed on Jan. 24, 2024; and Chinese Patent Application No. 202410483909.0, filed on Apr. 22, 2024, which are hereby incorporated by reference in its entirety.

TECHNICAL FIELD

The present invention relates to the field of lighting technology, particularly to multifunctional light bulbs as well as the devices and methods for controlling multifunctional light bulbs.

BACKGROUND

Most of the common traditional light bulbs in the current market only have lighting function. If heating function is needed, high-power tungsten filament bulbs will be used. The above two types of bulbs cannot adapt to the applications in different time periods or environments with different light intensities. If lighting or heating needs to be switched, traditional bulbs having a relatively single function cannot achieve both lighting and heating functions in the same bulb.

SUMMARY

The main purpose of the present invention is to propose a multifunctional light bulb and a control device and method for multifunctional light bulbs, aiming to solve the technical problem concerning the single function of traditional light bulbs in the prior art.

To achieve the above purposes, the present invention proposes a multifunctional light bulb, including:

a light head;

a light housing, located below the light head, forming an internal hollow chamber, and fixed or detachable at the bottom of the light head;

a heating component used to generate heat;

a light-emitting module used for illumination;

a the heat reflecting layer used to reflect and concentrate the heat generated by the luminous light;

both the heating component and the light-emitting module are jointly housed inside the light housing, and an insulation layer is provided between the heating component and the light-emitting module.

In further, the heat reflecting layer includes a first heat reflecting layer on the inner wall of the light housing and/or a second heat reflecting layer on the light-emitting module.

In further, the light-emitting module is an LED module, and the LED module includes a connector and an LED light installed on the connector.

In further, an insulation layer is provided on the inner wall of the connector, and a second heat reflecting layer is provided on the outer wall of the connector.

In further, the heating component is an electric heating wire or a heating plate.

On the other hand, the multifunctional light bulb is a multifunctional light bulb according to any one of claims 1 to 3, and the control device includes:

a main controller module used for exchanging, detecting, and providing signals;

a LED light module, including LED driver and LED light, used to convert electrical energy into light energy and electrical signals into light signals;

a heating wire module used to convert electrical energy into thermal energy;

a switch/dimmer module, used to control the on/off of LED light and heating wire, as well as adjust the brightness of LED light;

a wireless receiving module, used to connect with smart household devices to remotely control the on/off of LED light and heating wire in a multifunctional household system, and to adjust the brightness of LED light and the heating value of heating wire;

an ambient temperature sensing module used to measure the surrounding temperature, and the main controller module automatically adjusts the heating value of the heating wire based on the temperature sensed by the ambient temperature sensing module;

a main controller module that is electrically connected to the other modules mentioned above.

On the other side, the multifunctional light bulb is a multifunctional light bulb according to any one of claims 1 to 3, the control method includes the method for controlling the control device, including:

method 1: Control the on/off of LED light and heating wire through wireless receiving module, and adjust the brightness of LED light and the heating value of heating wire;

method 2: Control the on/off of LED light and heating wire through the switch/dimmer module, and adjust the brightness of LED light and the heating value of heating wire;

method 3: Through the ambient temperature sensing module, the main controller module automatically adjusts the heating value of heating wire when the ambient temperature sensing module senses the preset temperature.

Specifically, method 1 includes the following steps:

step 1, the smart household device sends the control information of multifunctional light bulb and heating wire to the wireless receiving module; the control information of multifunctional light bulb includes lighting switch control information and brightness adjustment information, while the control information of the heating wire includes the switch control information and heat adjustment information;

step 2, the wireless receiving module forwards the switch control information and brightness adjustment information of multifunctional light bulb, and the switch control information and heat adjustment information of heating wire to the main controller module;

step 3, the main controller module controls the LED driver to turn on or off or adjust the brightness of LED light based on the switch control information and brightness adjustment information of the multifunctional light bulb, and the switch control information and heat adjustment information of heating wire, as well as to control the on/off of the heating wire or adjust the heating value.

Specifically, method 2 includes the following steps:

step 1, the switch/dimmer module sends control information of multifunctional light bulb to the main controller module, and the control information of multifunctional light bulb includes switch control information and brightness adjustment information, and the control information of heating wire includes switch control information and heat adjustment information;

step 2, the main controller module controls the LED driver to turn on or off or adjust the brightness of LED light based on the switch control information and brightness adjustment information of multifunctional light bulb, and the control information and heat adjustment information of heating wire switch, as well as to control the on/off of heating wire or adjust the heating value.

Specifically, method 3 includes the following steps:

step 1: After the ambient temperature sensing module senses that the temperature is lower than the preset temperature, the ambient temperature sensing module sends heating wire control information to the main controller module;

step 2, the main controller module controls the heating wire to heat based on the control information sent by the ambient temperature sensing module, in order to automatically adjust the heating value of the heating wire.

The technical solution of the present invention includes a light head, a light housing, a heating component, and a light-emitting module, and the light-emitting module is provided with an LED light, and the heating component includes a heating wire and a control device, the main control module of the control device receives remote control signals from external smart household devices or receives wired control signals, can turn on and off the LED light and the heating wire through wired control or remote wireless control, or adjust the brightness of LED light and control the on/off of heating wire, or adjust the heating value of heating wire. The present technical solution allows the LED light to be illuminated separately, or the heating wire to be heated separately, or both illuminated and heated simultaneously, and the automatic adjustment of the heating value of the heating wire according to the ambient temperature detected by the ambient temperature probe.

The above figures include the following figure markings:

1. Control device; 11. Main controller module; 121. LED driver; 122. LED light; 13. Heating wire module; 14. Switch/dimmer module; 15. Ambient temperature sensing module; 16. Wireless receiving module; 2. Light head; 3. Light housing; 4. Connector; 5. Light-emitting module; 6. Heating components; 7. Transparent cover; 8. Insulation layer; 91. First heat reflecting layer; 92. Second heat reflecting layer.

DESCRIPTION OF EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms "first," "second" and the like, if any, in the present invention are only for illustrative purposes and cannot be understood as indicating or implying relative importance or the number of features referred to. Therefore, the features defined with "first" and "second" may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

Figure 1:
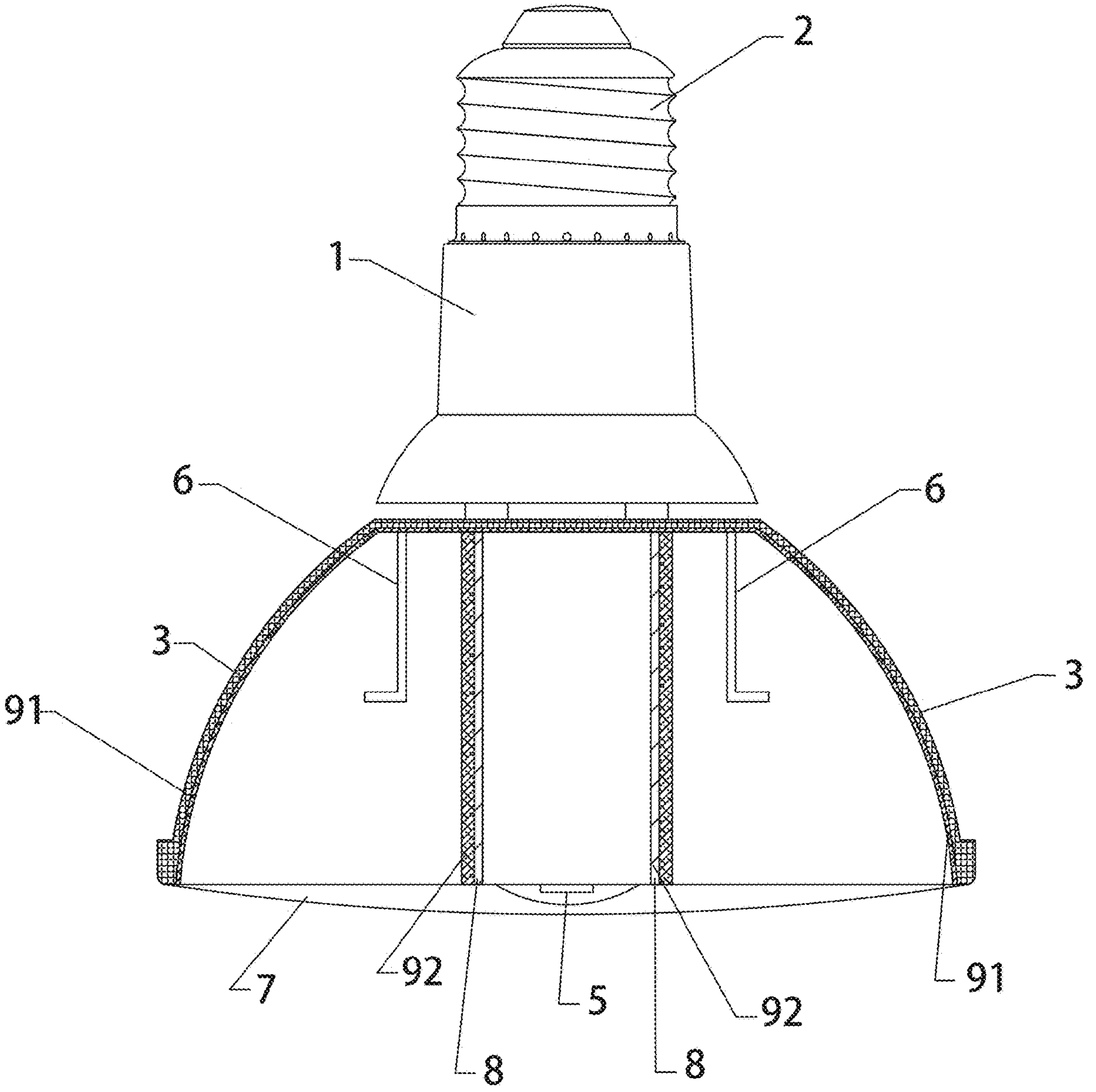
FIG. 1 is a sectional view of the multifunctional light bulb of the present invention.
Figure 2:
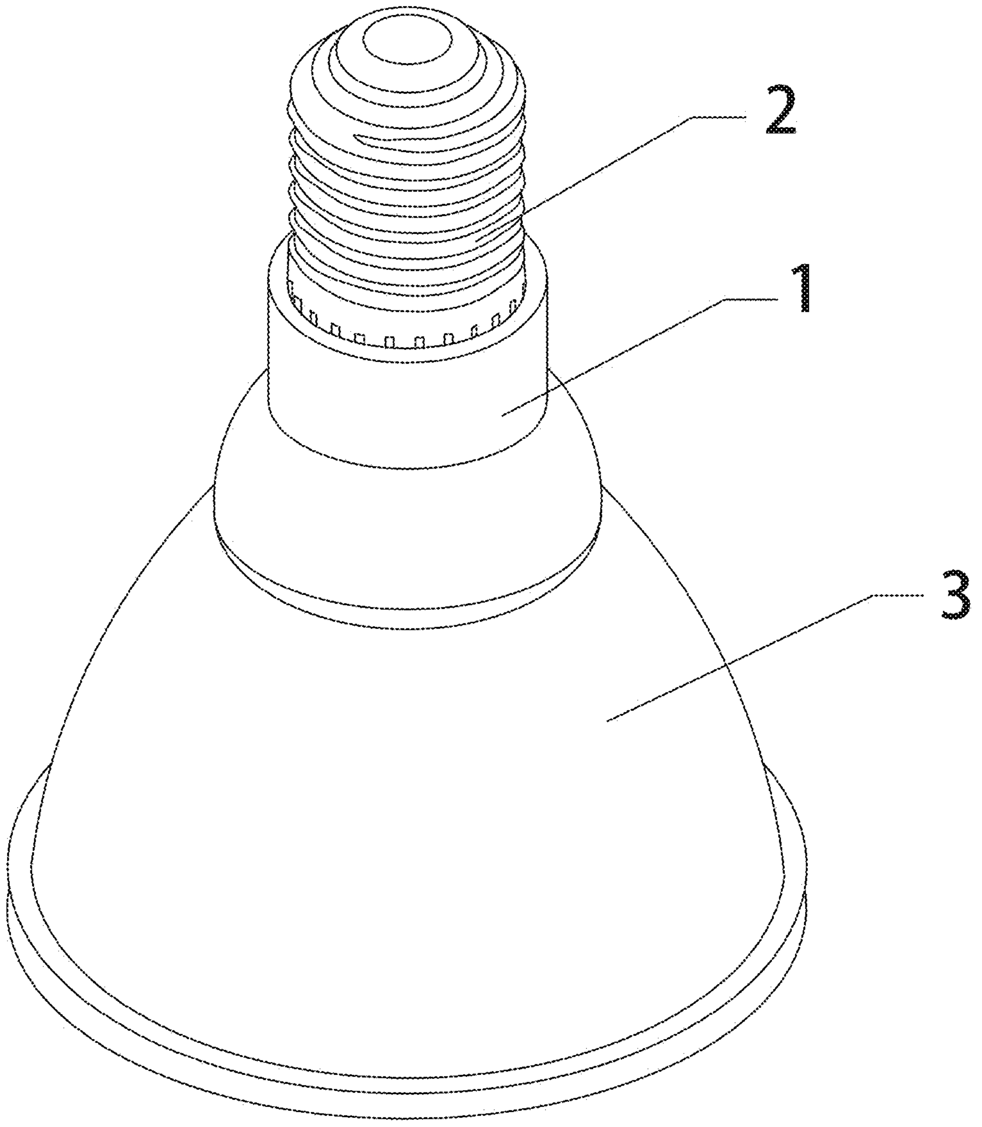
FIG. 2 is a three-dimensional view of the multifunctional light bulb of the present invention.
Figure 3:
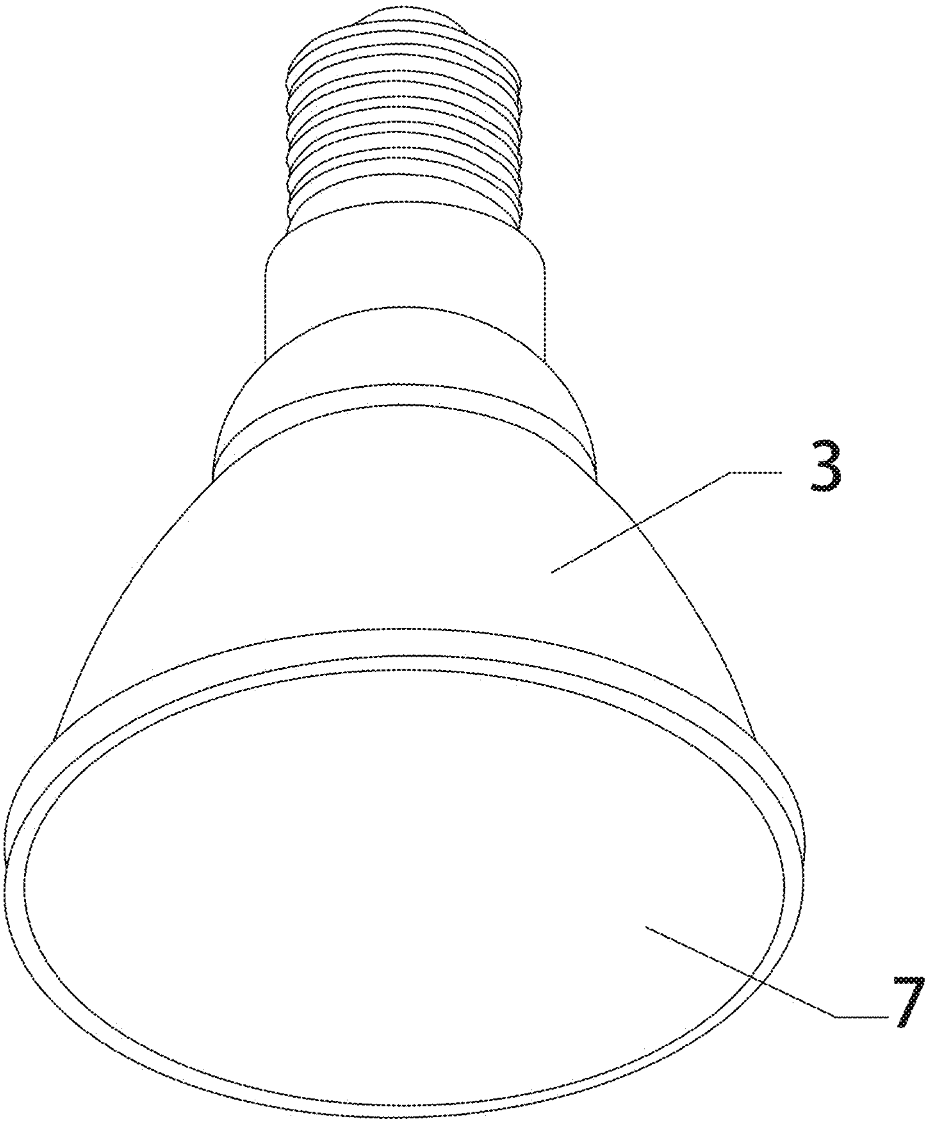
FIG. 3 is a three-dimensional view of the multifunctional light bulb of the present invention.
Figure 4:
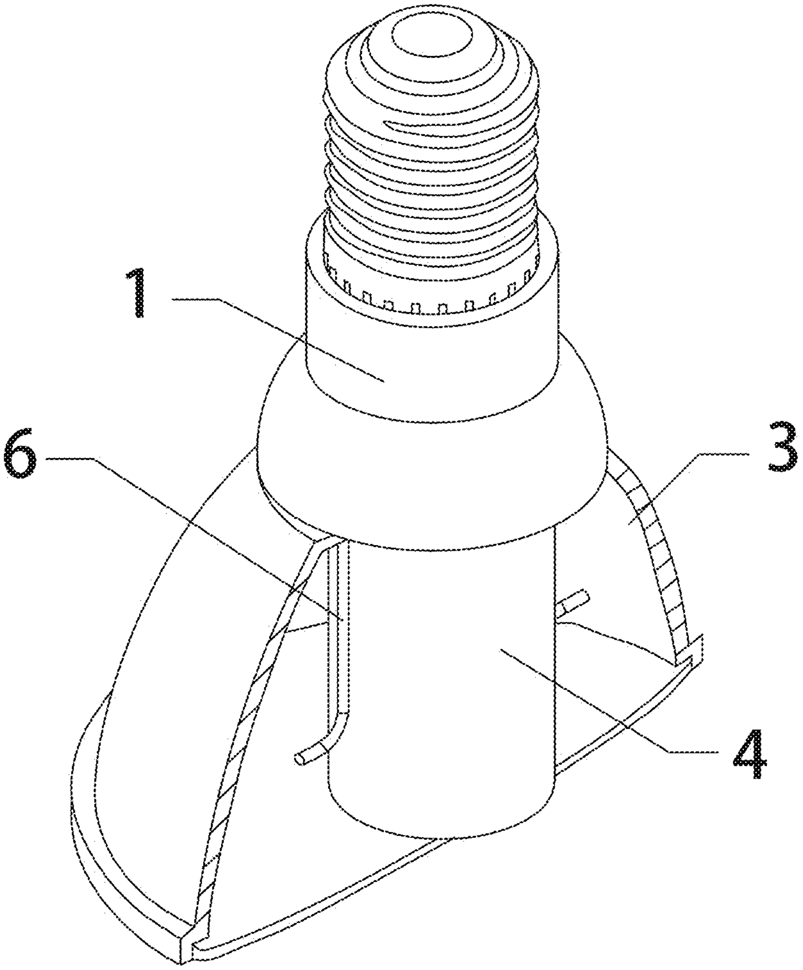
FIG. 4 is internal structure view 1 of light housing of the multifunctional light bulb of the present invention.
Figure 5:
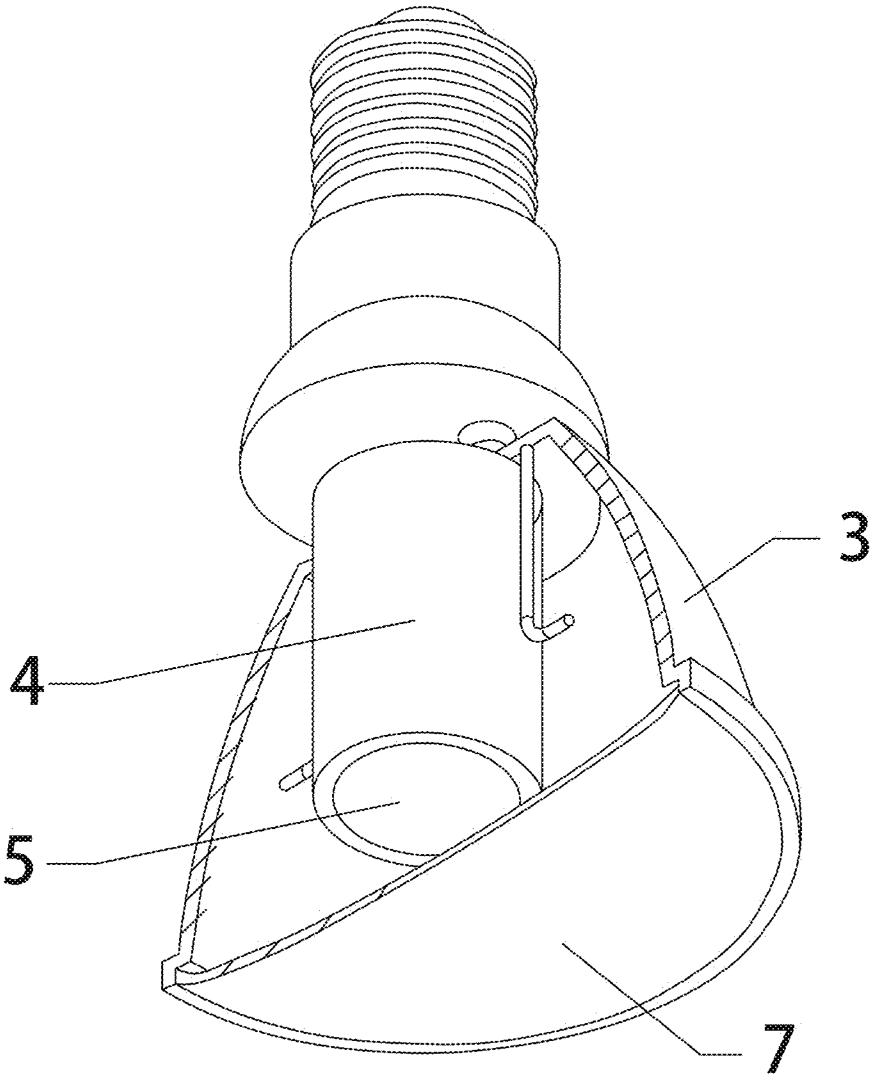
FIG. 5 is internal structure view 2 of light housing of the multifunctional light bulb of the present invention.
Figure 6:
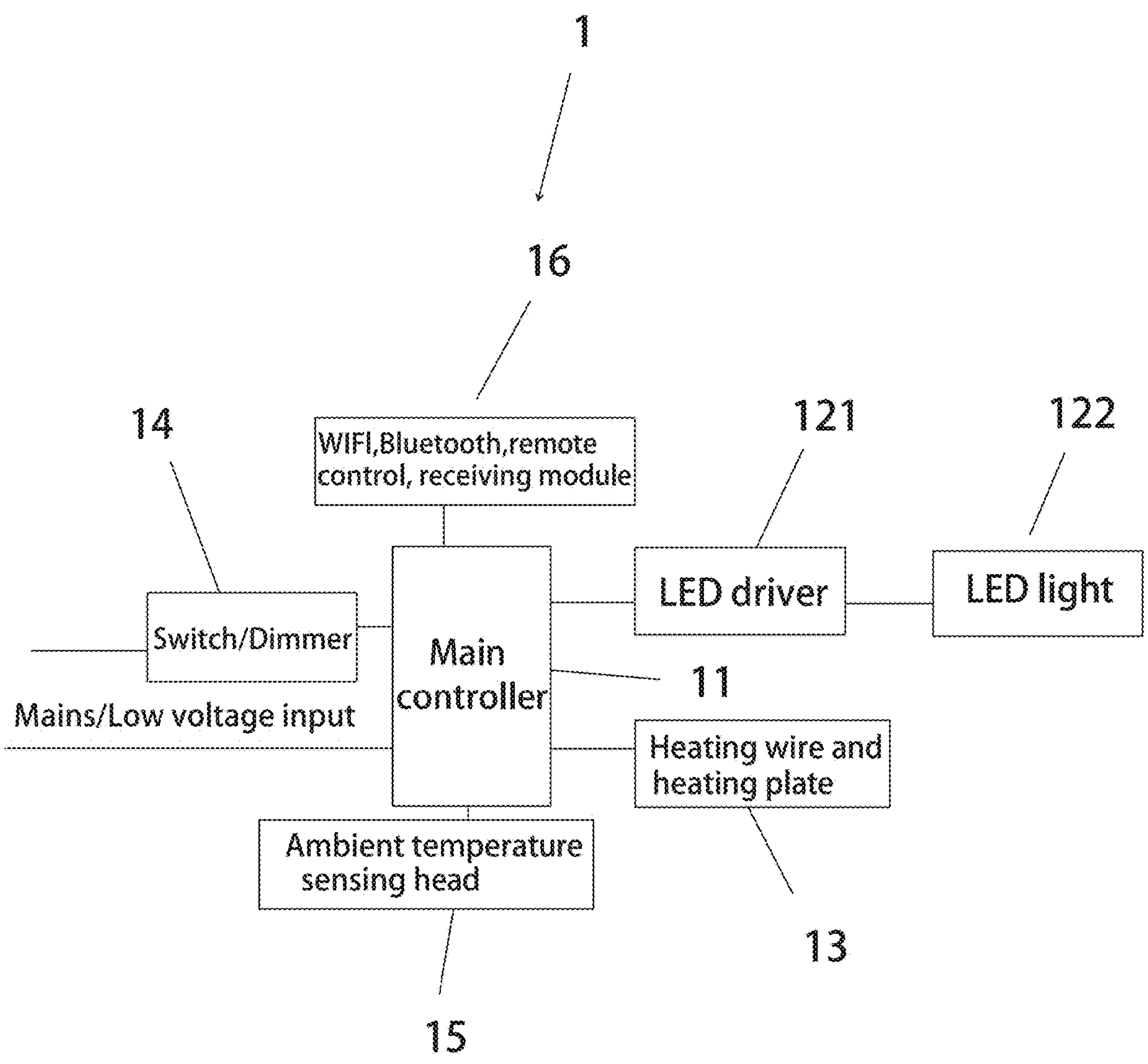
FIG. 6 is a block diagram of the control device of the present invention.

The present invention provides a multifunctional light bulb as well as a control device and method for the multifunctional light bulb, as shown in FIGS. 1 to 6, and the multifunctional light bulb includes a light head 2 that is used to fix the light bulb onto an external light holder and connect it to a power source, the light head 2 uses light bases of various specifications such as E14, E27, E12, E26, E40, or socket B22, and light head 2 applies to low voltage 12V, 24V, 48V, and also to high voltage 110V, 120V, 220V, 240V, etc;

Light housing 3 is located below light head 2, forming an internal hollow chamber, and light housing 3 is fixed or detachably installed at the bottom of light head 2, light housing 3 is made of any one of glass, ceramic, or hardware materials, and in the preferred embodiment of the present invention, light housing 3 is made of explosion-proof glass that has the explosion-proof degree meeting the explosion-proof performance specified by national standards;

Heating component 6 is used to generate heat;

Light-emitting module 5 is used for lighting and is provided with a luminous light;

The heating component 6 and light-emitting module 5 are jointly housed inside the light housing 3 and, in order to ensure that the light-emitting module 5 is not affected by the heat of heating component 6, an insulation layer 8 is provided between the heating component 6 and the light-emitting module 5, and the insulation layer 8 can isolate the heat transfer from the heating area to the light-emitting module 5, thereby preventing damage to the light-emitting module 5, ensuring the use stability of the light-emitting module 5 and extending the service life of light-emitting module 5.

In the embodiment, the invention also includes a heat reflecting layer that is used to reflect and concentrate the heat generated by the luminous lamp.

Specifically, the heat reflecting layer includes a first heat reflecting layer 91 located on the inner wall of light housing 3 and/or a second heat reflecting layer 92 located on the light-emitting module 5, the heat reflecting layer is used to reflect light, focus the light generated inside the bulb in one direction, improve the brightness and range of the light, and in order to achieve ideal performance, the characteristics such as high reflectivity, small dispersion, high temperature resistance, corrosion resistance, and wear resistance are required, and therefore the commonly used materials at present are aluminum, silver plated mirror reflection layer, and optical glass, in order to meet these requirements.

In the embodiment, the light-emitting module 5 is an LED module, the LED module includes a connector 4 and an LED light 122 installed on the connector 4, and the connector 4 is a cylindrical structure.

Specifically, the brightness of LED light 122 can be adjusted according to the actual use environment of lighting on site, and adjusting the brightness of LED light 122 through control circuits can ensure the lighting effectiveness in a more energy-efficient and environmentally friendly manner.

The embodiment also includes a wireless receiving module disposed inside the light head 2, and the wireless receiving module 16 includes wifi, Bluetooth, and a remote control receiving module, and wifi, Bluetooth and remote control receiving module can wirelessly control the on/off of the heating wire or LED light 122, as well as adjust the heat generated by the heating wire.

Specifically, the insulation layer 8 on the inner wall of the connector 4 can help block the heat generated from the light-emitting module 5, and the second heat reflecting layer 92 is disposed on the outer wall of the connector 4.

In the embodiment, the heating component 6 is an electric heating wire or heating plate.

Specifically, the amount of heat generated by the electric heating wire or heating plate can be adjusted, and the present invention can adjust the heat generated by the heating wire through the following externally connected devices:

1) Direct switch control: achieved by connecting the electric heating wire or heating plate to the switch/dimmer module 14, and the switch control is also known as two-point control, the heating wire stops heating when the actual temperature exceeds the preset upper limit, and begins to heat when the actual temperature is below the preset lower temperature limit, and if it is necessary to use this method, the present invention allows for direct connection to an external switch.
2) Temperature sensor control: the installed ambient temperature sensing module 15, such as a thermistor or thermocouple, can monitor the temperature of external environment in real time, and control the on/off of heating wire according to the preset temperature range.
3) Voltage regulator control: Control the temperature by adjusting the power supply voltage of heating wire. Different voltages can be provided through adjustable voltage regulators or power sources to control the heating power and temperature of heating wire, and this method is commonly used in equipment that requires precise temperature control, such as laboratory instruments.
4) Wireless control: achieved through connection to wireless receiving module 16, and the preset temperature curves or specific control algorithms can provide more precise temperature control and achieve remote monitoring and control.

The selection of these control methods depends on the specific application and requirements, and these control methods should be selected and adjusted according to the actual situation.

In the embodiment, the light-emitting module 5 includes a light-emitting light, and the light-emitting light is any one of incandescent light, halogen light, fluorescent light, energy-saving light, or LED light, and of course, in the embodiment, LED lights are preferred, because LED light has the advantages of energy conservation and environmental protection, and the light-emitting module 5 also includes a transparent cover 7 that can be used for LED light cooling, scattering prevention, and fixed illumination direction.

On the other hand, the present invention proposes a control device 1 for the multifunctional light bulb, and the control device 1 includes:

- a main controller module 11, the main controller module 11 is used to convert electrical energy into light energy and electrical signals into light signals;
- a LED light module, including LED driver 121 and LED light 122, used to convert electrical energy into light energy and electrical signals into light signals;
- a heating wire module 13 used to convert electrical energy into thermal energy;
- a switch/dimmer module 14, used to control the on/off of LED light and heating wire, as well as adjust the brightness of LED light;
- an ambient temperature sensing module 15 used to measure the surrounding temperature, and the main controller module 11 automatically adjusts the heating value of the heating wire based on the temperature sensed by the ambient temperature sensing module;
- a wireless receiving module 16, used to connect with smart household devices to remotely control the on/off of LED light 122 and heating wire in a multifunctional household system, and to adjust the brightness of LED light 122 and the heating value of heating wire;
- a main controller module 11 that is electrically connected to the other modules mentioned above.

On the other hand, the present invention proposes a control method for a multifunctional light bulb, and the control method includes:

- method 1: Control the on/off of LED light 122 and heating wire through wireless receiving module 16, and adjust the brightness of LED light 122 and the heating value of heating wire;
- method 2: Control the on/off of LED light 122 and heating wire through the switch/dimmer module 14, and adjust the brightness of LED light and the heating value of heating wire;
- method 3: Through the ambient temperature sensing module 15, the main controller module 11 automatically adjusts the heating value of heating wire when the ambient temperature sensing module 15 senses the preset temperature.

Method 1 includes the following steps:

- step 1, the smart household device sends the control information of multifunctional light bulb and heating wire to the wireless receiving module 16; the control information of multifunctional light bulb includes lighting switch control information and brightness adjustment information, while the control information of the heating wire includes the switch control information and heat adjustment information;
- step 2, the wireless receiving module 16 forwards the switch control information and brightness adjustment information of multifunctional light bulb, and the switch control information and heat adjustment information of heating wire to the main controller module 11;

step 3, the main controller module 11 controls the LED driver 121 to turn on or off or adjust the brightness of LED light 122 based on the switch control information and brightness adjustment information of the multifunctional light bulb, and the switch control information and heat adjustment information of heating wire, as well as to control the on/off of the heating wire or adjust the heating value.

Method 2 includes the following steps:

step 1, the switch/dimmer module 14 sends control information of multifunctional light bulb to the main controller module 11, and the control information of multifunctional light bulb includes switch control information and brightness adjustment information, and the control information of heating wire includes switch control information and heat adjustment information;

step 2, the main controller module 11 controls the LED driver 121 to turn on or off or adjust the brightness of LED light 122 based on the switch control information and brightness adjustment information of multifunctional light bulb, and the control information and heat adjustment information of heating wire switch, as well as to control the on/off of heating wire or adjust the heating value.

Method 3 includes the following steps:

step 1: After the ambient temperature sensing module 15 senses that the temperature is lower than the preset temperature, the ambient temperature sensing module 15 sends heating wire control information to the main controller module 11;

step 2, the main controller module 11 controls the heating wire to heat based on the control information sent by the ambient temperature sensing module 15, in order to automatically adjust the heating value of the heating wire.

The technical solution of the present invention can be applied to various types of light bodies, such as aromatherapy lights, plant lighting, pet lighting, bedroom lighting, bathroom lighting, and outdoor camping lights.

In the present invention, the main control module of the control device receives remote control signals from external smart household devices (mobile phones, computer products, remote controls, wireless Bluetooth products, etc.) or receives wired control signals, can turn on and off the LED light and the heating wire through wired control or remote wireless control, or adjust the brightness of LED light and control the on/off of heating wire, or adjust the heating value of heating wire. The present technical solution allows the LED light to be illuminated separately, or the heating wire to be heated separately, or both illuminated and heated simultaneously, and the automatic adjustment of the heating value of the heating wire according to the ambient temperature detected by the ambient temperature probe.

The above are only the preferred embodiments of the present invention, and are not intended to limit the present invention. Any equivalent structural transformation made based on the description and accompanying drawings hereof under the concept of present invention, or be directly/indirectly applied in other related technical fields, should fall within scope of patent protection of the present invention.

What is claimed is:

1. A multifunctional light bulb, including:

a light head;

a light housing, located below the light head, forming an internal hollow chamber, and fixed or detachable at the bottom of the light head;

a heating component used to generate heat;

a light-emitting module used for illumination, the light-emitting module includes a luminous light;

a heat reflecting layer used to reflect and concentrate the heat generated by the luminous light;

both the heating component and the light-emitting module are jointly housed inside the light housing, and an insulation layer is provided between the heating component and the light-emitting module;

the heat reflecting layer includes a first heat reflecting layer on the inner wall of the light housing and/or a second heat reflecting layer on the light-emitting module;

the light-emitting module is an LED module, and the LED module includes a connector and an LED light installed on the connector;

the insulation layer is provided on the inner wall of the connector, and the second heat reflecting layer is provided on the outer wall of the connector.

2. The multifunctional light bulb according to claim 1, wherein the heating component is an electric heating wire or a heating plate.

3. The multifunctional light bulb according to claim 1, wherein the multifunctional light bulb further includes a control device: the control device includes:

a main controller module used for exchanging, detecting, and providing signals;

an LED light module, including LED driver and LED light, used to convert electrical energy into light energy and electrical signals into light signals;

a heating wire module used to convert electrical energy into thermal energy;

a switch/dimmer module, used to control the on/off of LED light and heating wire, as well as adjust the brightness of LED light;

a wireless receiving module, used to connect with smart household devices to remotely control the on/off of LED light and heating wire in a multifunctional household system, and to adjust the brightness of LED light and the heating value of heating wire;

an ambient temperature sensing module used to measure the surrounding temperature, and the main controller module automatically adjusts the heating value of the heating wire based on the temperature sensed by the ambient temperature sensing module;

a main controller module that is electrically connected to the other modules mentioned above.

* * * * *